Patented Apr. 26, 1949

2,468,701

UNITED STATES PATENT OFFICE 2,468,701

REMOVAL OF HYDROGEN SULFIDE FROM OILS

Stephen P. Cauley, Garden City, N. Y., assignor to Socony-Vacuum Oil Company, Incorporated, a corporation of New York No Drawing. Application January 25, 1945, Serial No. 574,629

9 Claims. (Cl. 196—32)

The present invention relates to the removal of hydrogen sulfide from oils, and, more particularly, from petroleum oils.

In the refining of petroleum oils, the first operation is a distillation in which the oil is separated into straight run gasoline, straight run kerosene, gas oils and possibly certain heavier cuts. In the case of crude oils having a considerable content of sulfur or associated in their producing formation with hydrogen sulfide gases as is frequently the case, the distillate fractions have considerable hydrogen sulfide associated with them and dissolved in them. Normally these cuts, particularly the straight run gasoline and straight run kerosene fractions, must be treated to remove this hydrogen sulfide. When the gas oil is subjected to cracking, complex sulfur constituents of the nature of heavy mercaptans and the like in the gas oil break up to give lighter mercaptans and hydrogen sulfide. Consequently, the distillate fractions of the boiling nature of gasoline, as produced, whether from the distillation of crude or from the cracking of gas oil, are practically always contaminated with sulfur in two forms to a greater or less extent. The sulfur contaminant appears both as hydrogen sulfide dissolved in the distillate fraction and as mercaptans dissolved in the distillate fraction, both must be removed to give an acceptable product. Because the hydrogen sulfide is more highly reactive than mercaptans there has been little or no success with processes attempting to remove both at the same time.

The conventional or customary method of refining petroleum oil or fractions to remove hydrogen sulfide and mercaptans has been reduced by the industry to a two-stage process in which the oil or distillate is first scrubbed with a relatively weak caustic solution for the purpose of removing hydrogen sulfide using a reagent not sufficiently active to remove mercaptans. After the hydrogen sulfide has been removed the distillate is treated in the second step of the process to remove mercaptans.

The second step comprises scrubbing the distillate with an aqueous solution of a stronger caustic than employed in the first step. This stronger caustic solution or second caustic solution may contain solutizers or may be free of solutizers. As those skilled in the art know, solutizers are organic compounds of varied character which increase the solubility of mercaptans in caustic solutions. Among the known solutizers, to mention a few, are isobutyric acid in the form of its alkali metal salts, cresols, alkanolamines. The most widely used solutizer is cresol. When the mercaptans are not absorbed in strong caustic solution with or without solutizers the distillate is subjected to some other treatment in the second step, such as "doctor" treatment, copper chloride sweetening or the like, designed to convert the mercaptans into some other compound which has heretofore been considered innocuous when present in the distillate or to remove the mercaptans from the distillate. In industrial operations, it is not usual to regenerate the first or weak caustic solution. This solution is used until it is no longer capable of effecting the desired reduction in hydrogen sulfide and then discarded. In contradistinction, the second solution when no longer capable of efficient removal of mercaptans is subjected to some treatment for the regeneration of the reagent.

The foregoing brief description of conventional prior treatment of distillate to remove hydrogen sulfide and mercaptans makes it manifest that the weak caustic solution almost invariably is wasted at intervals. In contradistinction to this previous general practice it has now been found that the prior art weak caustic solution can be replaced by an absorptive medium which can be regenerated in a simple, cheap and efficacious manner.

It is an object of the present invention to provide a process for removing hydrogen sulfide from petroleum oil with a relatively weakly alkaline aqueous solution which may be regenerated. It is another object of the present invention to provide a process for removing hydrogen sulfide from petroleum oil with an aqueous solution containing an alkaline reacting salt of an alkali metal and regeneration of the absorptive efficiency of the aqueous solution by oxidation. It is a further object of the present invention to provide an aqueous alkaline hydrogen sulfide absorptive solution capable of regeneration by oxidation. The present invention likewise contemplates the provision of a method for removing hydrogen sulfide from petroleum distillates employing an aqueous solution containing an alkaline reacting salt of an alkali metal and an organic substance capable of promoting the oxidation of hydrogen sulfide to elemental sulfur. The present invention also provides a method for removing hydrogen sulfide from petroleum distillates employing an aqueous solution containing an alkaline reacting salt of an alkali metal, an organic substance capable of promoting or accelerating the oxidation of hydrogen sulfide to elemental sulfur and a compound capable of protecting said organic oxidation promoter or accelerator from destructive oxidation. Other objects and advantages will become apparent from the following description.

In general the present invention provides a method for removing hydrogen sulfide from petroleum distillates containing the same by washing or scrubbing or contacting the sour distillate with an aqueous solution of at least one salt reacting alkaline, and preferably an alkali metal salt of an acid having a polyvalent anion, the mono alkali metal salt of which has a dissociation constant not substantially greater than about $9.1 \times 10^{-8}$ or a mixture of such salts. The aqueous solution also contains, at least during regeneration, an organic substance capable of promoting or accelerating or catalyzing the oxidation of the inorganic sulfide-sulfur (hydrogen sulfide-sulfur) to elemental sulfur when oxygen, air, oxygen-containing oxidizing gas or other oxidizing gas is passed through an alkaline reacting solution containing hydrogen sulfide and said organic oxidation promoter. It is not clear at this time whether the organic oxidation promoter acts as a catalyst or as an oxygen acceptor which is alternately oxidized by the oxygen and reduced by the hydrogen sulfide-sulfur. Nevertheless, in the presence of such an organic oxidation promoter hydrogen sulfide-sulfur is oxidized to elemental sulfur.

It is to be noted that the preferred oxidation promoters are destructively oxidized in the absence of hydrogen sulfide and that consequently in the regeneration of fat aqueous solution containing hydrogen sulfide-sulfur the hydrogen sulfide-sulfur should not be reduced appreciably below about 0.3 per cent sulfur. However, operation under these conditions involves meticulous care in controlling the extent of oxidation of the sulfide-sulfur and it is preferable to incorporate in the aqueous alkaline solution, at least during regeneration, a substance which is more readily oxidized than the oxidation promoter but less readily oxidized than hydrogen sulfide is oxidized to elemental sulfur.

After contacting sour distillate containing hydrogen sulfide with the aqueous alkaline solution until the solution will remove little, if any, hydrogen sulfide the "fat" aqueous alkaline solution is regenerated with respect to its power to absorb hydrogen sulfide or remove hydrogen sulfide from sour distillate by passing an oxidizing gas such as oxygen-containing oxidizing gas, for example, air or oxygen, through the fat solution until the sulfide-sulfur content is not greater than 0.3 per cent when no protector is present in the fat solution or until substantially all of the sulfide-sulfur has been converted to elemental sulfur when a protector for the oxidation promoter is present. The elemental sulfur is removed in any suitable manner and the regenerated solution, lean in sulfide-sulfur, returned to the scrubbing stage of the process. The elemental sulfur can be separated from the regenerated solution by salting out or by washing with a suitable solvent for elemental sulfur such as light petroleum fractions.

While salts of the alkali metals having an alkaline reaction such as, for example, the carbonates, triphosphates, diphosphates, borates and the like are preferred, analogous salts of the organic amines and alkanolamines may be used. Of course, those skilled in the art know that trisodiumphosphate, for example, usually contains a small amount of free caustic soda. Nevertheless, the absence of the small amount of free alkali does not materially affect the results obtained when using trialkali phosphates substantially free from free unreacted alkali metal hydroxide.

In addition to the alkaline reacting absorptive reagent the absorptive solution must contain an oxidation promoter capable of accelerating the oxidation of inorganic sulfide-sulfur to elemental sulfur. Preferably the oxidation promoter is an organic substance. It is preferred to employ polyhydroxy benzenes, polyhydroxy benzene carboxylic acids, esters, glucosides, condensation products and derivatives of polyhydroxy benzene carboxylic acids particularly as the oxidation promoter or oxygen acceptor.

The third component of the absorptive mixture is a sulfur bearing compound which plays the role of a promoter protector during the regeneration of the absorptive solution. The role of the promoter protector and the need for the promoter protector to provide optimum conditions for economical, foolproof industrial operation will be more readily understood by consideration of the following:

All of those skilled in the art know that for efficient absorption of any substance it is generally necessary that the absorptive medium when brought into contact with the medium containing the substance to be absorbed contain as little of the substance to be absorbed as possible. From the standpoint of ideal conditions the concentration of the substance to be absorbed in the absorptive medium should be zero. In a cyclic system involving absorption by the absorptive medium and regeneration of the absorptive medium the minimum practical concentration of the material to be absorbed in the regenerated absorptive medium is known as the re-entry value. The re-entry values for hydrogen sulfide of most of the alkaline absorptive solutions known to the art are generally known. When the alkaline absorptive solutions are to be regenerated by oxidation of the sulfide-sulfur to elemental sulfur as provided by the present process, difficulty is encountered in reaching a practical re-entry value without destroying the oxidation promoter or at least reducing its accelerating effect upon the reaction. Accordingly, it is preferred to protect the oxidation promoter in one of two ways. Either the sulfide-sulfur concentration is only reduced to a value concomitant with retained promoter activity or a substance is maintained in the absorptive alkaline solution at least during regeneration which protects the oxidation promoter from destruction, inhibition or conversion to an inactive form. It would appear at this time that the characteristic of the protector is an oxidation potential less than that of the oxidation promoter and greater than that of the sulfur to be oxidized. However, as pointed out hereinbefore the sulfide-sulfur to be oxidized to elemental sulfur may be employed as the promoter protector although this entails more highly skilled and more ubiquitous supervision. Therefore, it is usually preferred to employ a promoter protector having an oxidation potential at unit activity between that of hydrogen sulfide-sulfur and that of the oxidation promoter. When the regeneration of the alkaline absorptive medium is carried out in the presence of such a promoter protector, highly skilled supervision of the regeneration operation may be reduced from constant to very intermittent. In other words, the promoter protector functions as does the governor of an engine to maintain the oxidation within the limits of substantially complete oxidation of the sulfide-sulfur to elemental sulfur and non-destructive, or non-inhibitory, or non-inactivating oxidation of the promoter.

In addition to the foregoing characteristic, the promoter protector should possess an additional characteristic, to wit, the property of effectively protecting the promoter at a concentration not markedly affecting the efficiency of hydrogen sulfide absorption. Among the substances satisfying the foregoing qualifications the thiosulfate ion has been found to provide, satisfactory results from the viewpoints of economy and satisfactory technical operation.

It is preferred to employ aqueous solutions of salts having an alkaline reaction. Such salts as the phosphates, other than mono-phosphates, carbonates and borates of lithium, sodium, potassium and ammonium are useful. For reasons of economy aqueous solutions of sodium carbonate or trisodium phosphate are especially preferred.

To the fundamental or basic alkaline absorptive medium is added the oxidation promoter. Among the substances which may be used it is preferred to use (1) polyhydroxy benzenes or (2) polyhydroxy benzene carboxylic acids or esters, glucosides, derivatives or condensation products of polyhydroxy benzene carboxylic acids or a mixture of the foregoing polyhydroxy benzenes and polyhydroxy benzene carboxylic acids and/or derivatives of the latter. Those skilled in the art will recognize the foregoing as related materials both being compounds having a functional or active polyhydroxy benzene nucleus. Of these compounds it is preferred to use pyrogallol, hydroquinone or resorcinol of the group one compounds and tannins of the group two compounds.

Tannins, as most chemists know, are complex materials the exact composition of which is not completely known. However, polyhydroxy benzene carboxylic acids such as the dihydroxy benzoic acids, including proto-catechuic acid and the resorcyclic acids, the trihydroxy benzoic acids such as gallic acid and its related compounds and derivatives are found useful. Nevertheless, a particular preference is had for those substances known as tannin or tannic acid. The term tannic acid or tannin is understood to cover those substances generally so grouped. Most of them are substances widely distributed in the vegetable kingdom. They are soluble in water, possess an acid, astringent taste, are colored dark blue or green by ferrous salts, precipitate gelatin, and form leather when applied to animal hides. The constitution of many tannins is still somewhat obscure. Some appear to be glucosides of gallic acid, and decompose into gallic acid and sugar upon boiling with dilute acids. Others contain phloroglucin. Upon fusing with KOH these mostly form proto-catechuic acid and phloroglucin. Among the tannic acid compounds included in that term for the purpose of this invention there may be named gallo-tannic acid, digallic acid, gallyl-gallic acid and the various tannin materials derived from oak-bark, quinine-bark, coffee, moringa-tannin, cutch, chestnut, logwood, sumac, and many other natural sources. Many such compositions appear to contain compounds of the nature of polyhydroxy flavpinacoles, yielding, upon fusion with alkali, polyhydroxy benzenes such as phloroglucin, resorcinol, or pyrogallol, and polyhydroxy benzene carboxylic acids such as proto-catechuic or gallic acids. All such compounds are considered to be equivalent and embraced by the term tannic acid as herein used. A wide variety of vegetable tannins may be used satisfactorily. Illustrative of the type of tannins which may be employed are chestnut, wattle, quercitron, quebracho (cold water extract), tara, Osage orange, logwood #4, ulmo, quebracho (hot water extract), spruce, oak, sumac, cutch, and gambier. All of these compounds or mixtures may be employed and give regeneration at useful rates although the materials vary among themselves in efficiency.

As a result of the foregoing discussion those skilled in the art will understand that the absorptive solution which it is preferred to employ in the present process is an aqueous solution of a salt reacting alkaline and preferably an alkali metal salt of an acid having a polyvalent anion the mono alkali salt of said acid radical having a dissociation constant not substantially greater than about $9.1 \times 10^{-8}$. It is preferred particularly to employ aqueous solution of $Na_2CO_3$ or $Na_3PO_4$ containing at least one of the oxidation promoters selected from the group polyhydroxy benzenes, polyhydroxy benzene carboxylic acids and esters, glucosides, condensation products and derivatives of polyhydroxy benzene carboxylic acids. It is especially preferred to employ aqueous solutions of sodium carbonate or trisodium phosphate containing tannin and a promoter protector such as sodium thiosulfate.

Soda ash or sodium carbonate is employed in concentrations up to about 10 per cent and preferably about 3 per cent. Tripotassium phosphate can be used in concentrations up to 40 per cent to 50 per cent by weight although weaker solutions, say about 10 per cent to 15 per cent concentration, are more effective absorptive media. Trisodium phosphate can be used in about the same strength as tripotassium phosphate. The absorptive solutions should contain about 1 per cent to about 3 per cent of oxidation promoter for most effective action upon the oxidation of the sulfide-sulfur although concentrations as low as 0.1 per cent may be used. An increase in the concentration of the oxidation promoter to higher than about 5 per cent appears to yield diminishing returns.

When residual sulfide-sulfur is employed to protect the oxidation promoter, the sulfide-sulfur of the absorptive solution should not be reduced appreciably below about 0.3 per cent sulfur during regeneration. When the thiosulfate ion is employed as the catalyst protector, it should be present in the amount of about 0.05 per cent to about 5 per cent by weight and usually and preferably the amount will vary between about 0.1 per cent and about 1.0 per cent by weight calculated as $Na_2S_2O_3$.

It will be recognized from the foregoing that when a promoter protector such as thiosulfate ion is incorporated in the absorptive solution either while on stream or during regeneration, the absorptive solution may be completely regenerated with respect to its hydrogen sulfide or inorganic-sulfide. In other words, the re-entry value of an absorptive solution containing thiosulfate ion is substantially zero sulfide-sulfur. On the other hand, when sulfide-sulfur is the promoter protector, the re-entry value is about 0.3 per cent to about 0.35 per cent sulfide-sulfur. Therein lies another advantage in employing a promoter protector other than the sulfide-sulfur which is introduced as hydrogen sulfide into the solution. The following aqueous solutions may be used as absorptive media with regeneration by oxidation preferably with air.

Table I

| Alkaline Absorptive Reagent | Percent Weight Broad | Percent Weight Preferred | Catalyst | Percent Weight Broad | Percent Weight Preferred | Catalyst Protector | Percent Weight Broad | Percent Weight Preferred |
|---|---|---|---|---|---|---|---|---|
| $Na_2CO_3$ | 1–10 | 3 | Tannin | 0.1–10 | 1–3 | $Na_2S_2O_3$ | 0.05–5 | 0.1–1 |
| $Na_3PO_4$ | 5–50 | 10–15 | do | 0.1–10 | 1–3 | do | 0.05–5 | 0.1–1 |
| $K_3PO_4$ | 5–50 | 10–15 | do | 0.1–10 | 1–3 | do | 0.05–5 | 0.1–1 |
| $Na_2CO_3$ | 1–10 | 3 | Hydroquinone | 0.1–10 | 1–3 | do | 0.05–5 | 0.1–1 |
| $Na_2CO_3$ | 1–10 | 3 | Gallic Acid | 0.1–10 | 1–3 | do | 0.05–5 | 0.1–1 |
| $Na_3PO_4$ | 5–50 | 10–15 | Pyrogallol | 0.1–10 | 1–3 | do | 0.05–5 | 0.1–1 |
| $K_3PO_4$ | 5–50 | 10–15 | Hydroquinone | 0.1–10 | 1–3 | do | 0.05–5 | 0.1–1 |
| $Na_2B_2O_4$ | 5–20 | 10–15 | Tannin | 0.1–10 | 1–3 | do | 0.05–5 | 0.1–1 |

The removal of hydrogen sulfide from petroleum oil, petroleum distillates and other water immiscible materials containing free hydrogen sulfide may be carried out employing any of the aqueous alkaline solutions described or mentioned hereinbefore by intimately contacting the material containing free hydrogen sulfide with the aqueous solution at suitable temperatures of about 60° F. to about 100° F. The oil and aqueous solution are contacted in a closed system devoid of substantial amounts of oxidizing gas and the aqueous solution regenerated outside the absorption system. The absorptive solution is regenerated by oxidation of the sulfide-sulfur to elemental sulfur which is recovered by salting out or other suitable means. When desirable the regenerated solution may be washed with a suitable solvent for elemental sulfur such as light petroleum fractions. It will be noted that the hydrogen sulfide is probably present in the absorption solution as NaHS.

In the regeneration of the absorptive solution the NaHS is oxidized to elemental sulfur which is removed as such. This is in distinct contrast to prior art process wherein the absorptive solution is regenerated by removal of the hydrogen sulfide in the form of gaseous hydrogen sulfide.

The regeneration of the absorptive solution may be intermittent but it is preferred to regenerate the solution substantially continuously. That is to say, a portion of the absorptive solution is removed substantially continuously to a container outside the absorption system and there regenerated by blowing oxygen or oxidizing oxygen-containing gas such as air therethrough until the sulfur content other than elemental sulfur is reduced to a suitable re-entry value.

Although the present invention has been described in conjunction with certain preferred embodiments thereof, these embodiments are not to be considered limiting and the invention is only to be limited by the scope of the appended claims.

I claim:

1. A method of regenerating alkaline solutions containing hydrogen sulfide-sulfur, an alkali metal salt of an acid having a polyvalent anion the mono-alkali metal salt of said acid having a dissociation constant not substantially greater than about $9.1 \times 10^{-8}$, a hydroxy phenolic oxidation promoter itself capable of oxidation and an amount effective to prevent substantially inactivation of said oxidation promoter and not more than about 1 weight percent of a soluble compound having an oxidation potential at unit activity between that of hydrogen sulfide-sulfur and that of said phenolic oxidation promoter, which comprises passing a free-oxygen containing gas through said solution until a major portion of said sulfide-sulfur is converted to free sulfur, and separating said free sulfur.

2. A method of regenerating alkaline solutions containing hydrogen sulfide-sulfur, an alkali metal salt selected from the group consisting of carbonates, phosphates and borates, a hydroxy phenolic oxidation promoter itself capable of oxidation and an amount effective to prevent substantially inactivation of said promoter and not more than about 1 weight percent of a soluble compound having an oxidation potential at unit activity between that of hydrogen sulfide-sulfur and that of said phenolic oxidation promoter, which comprises passing a free-oxygen containing gas through said solution until substantially all of said sulfide-sulfur is converted to free sulfur, and separating said free sulfur.

3. A method of regenerating alkaline solutions containing hydrogen sulfide-sulfur, an alkali metal salt selected from the group consisting of carbonates, phosphates and borates, a phenolic oxidation promoter itself capable of oxidation and selected from the group of polyhydroxy aromatic compounds having two hydroxyl groups attached to the same 6 carbon atom ring in positions ortho to each other and polyhydroxy aromatic compounds having two hydroxyl groups attached to the same 6 carbon atom ring in positions para to each other and an amount effective to prevent substantially inactivation of said oxidation promoter and not more than about 1 weight percent of a soluble compound having an oxidation potential at unit activity between that of hydrogen sulfide-sulfur and that of said phenolic oxidation promoter, which comprises passing a free-oxygen containing gas through said solution until substantially all of said sulfide-sulfur is converted to free sulfur, and separating said free sulfur.

4. A method of regenerating alkaline solutions containing hydrogen sulfide-sulfur, an alkali metal salt selected from the group consisting of carbonates, phosphates and borates, a phenolic oxidation promoter itself capable of oxidation and selected from the group of polyhydroxy aromatic compounds having two hydroxyl groups attached to the same 6 carbon atom ring in positions ortho to each other and polyhydroxy aromatic compounds having two hydroxyl groups attached to the same 6 carbon atom ring in positions para to each other and an amount effective to prevent substantially inactivation of said oxidation promoter and not more than about 1 weight percent of a soluble thiosulfate, which comprises passing a free-oxygen containing gas through said solution until substantially all of said sulfide-sulfur is converted to free sulfur, and separating said free sulfur.

5. A method of regenerating alkaline solutions containing hydrogen sulfide-sulfur, trisodium phosphate, tannic acid, and an amount effective to prevent substantially inactivation of said tannic acid and not more than about 1 weight percent of alkali metal thiosulfate, which comprises passing a free-oxygen containing gas through said solution until substantially all of said sulfide-sulfur is converted to free sulfur, and separating said free sulfur.

6. A process for removing free hydrogen sulfide from a liquid mixture of hydrocarbons which comprises contacting in a closed system devoid of substantial amounts of oxidizing gas said liquid mixture containing hydrogen sulfide and an aqueous alkaline solution containing an alkali metal salt of an acid having a dissociation constant not substantially greater than about $9.1 \times 10^{-8}$, a hydroxy phenolic oxidation promoter itself capable of air oxidation and an amount effective to prevent substantially inactivation of said oxidation promoter and not more than about 1 weight per cent of a soluble compound having an oxidation potential at unit activity between that of hydrogen sulfide and that of said oxidation promoter to cause said aqueous solution to absorb at least a portion of said hydrogen sulfide and to form a fat aqueous solution containing sulfide-sulfur, separating said fat aqueous solution containing sulfide-sulfur from contacted liquid mixture, passing a free-oxygen containing gas through at least a portion of said fat aqueous solution to convert at least a major portion of said sulfide-sulfur to elemental sulfur, separating said elemental sulfur to obtain a lean aqueous alkaline solution, and contacting a further amount of said liquid mixture of hydrocarbons therewith.

7. The process as set forth and described in claim 6 wherein the alkali metal salt is a carbonate and the phenolic oxidation promoter is a tannin.

8. The process as set forth and described in claim 6 wherein the alkali metal salt is a trisodium phosphate and the phenolic oxidation promoter is a tannin.

9. The process as set forth and described in claim 6 wherein the alkali metal salt is a polyhydroxybenzene carboxylic acid theoretically capable of forming a quinone.

STEPHEN P. CAULEY.

REFERENCES CITED

The following references are of record in the file of this patent:

UNITED STATES PATENTS

| Number | Name | Date |
| --- | --- | --- |
| 1,827,912 | Rosenstein | Oct. 20, 1931 |
| 1,832,325 | Rosenstein | Nov. 17, 1931 |
| 1,943,744 | Rosenstein | Jan. 16, 1934 |
| 2,015,038 | Pevere | Sept. 17, 1935 |
| 2,315,530 | Loyd | Apr. 6, 1943 |
| 2,316,092 | Loyd | Apr. 6, 1943 |
| 2,369,771 | Bond | Feb. 20, 1945 |
| 2,413,945 | Bolt | Jan. 7, 1947 |

FOREIGN PATENTS

| Number | Country | Date |
| --- | --- | --- |
| 126,544 | Hungary | Mar. 17, 1941 |